Dec. 13, 1960 — H. G. PETERSON — 2,964,126
RECIPROCATING DRAG CONVEYOR
Original Filed Sept. 3, 1957 — 2 Sheets-Sheet 1
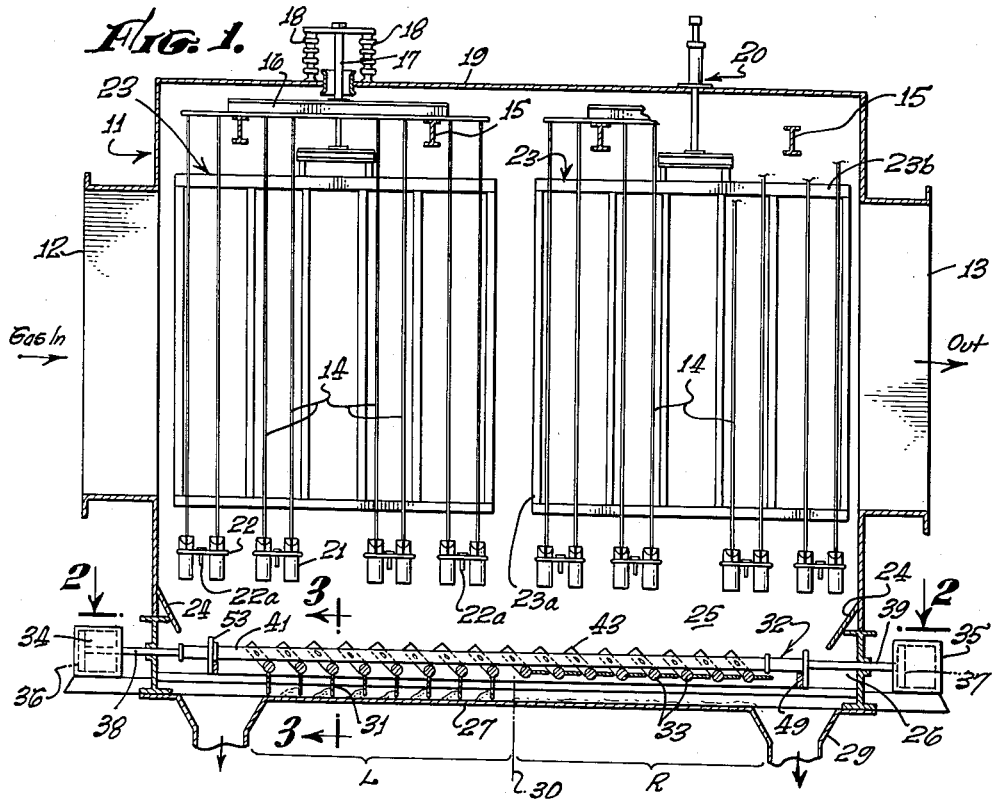
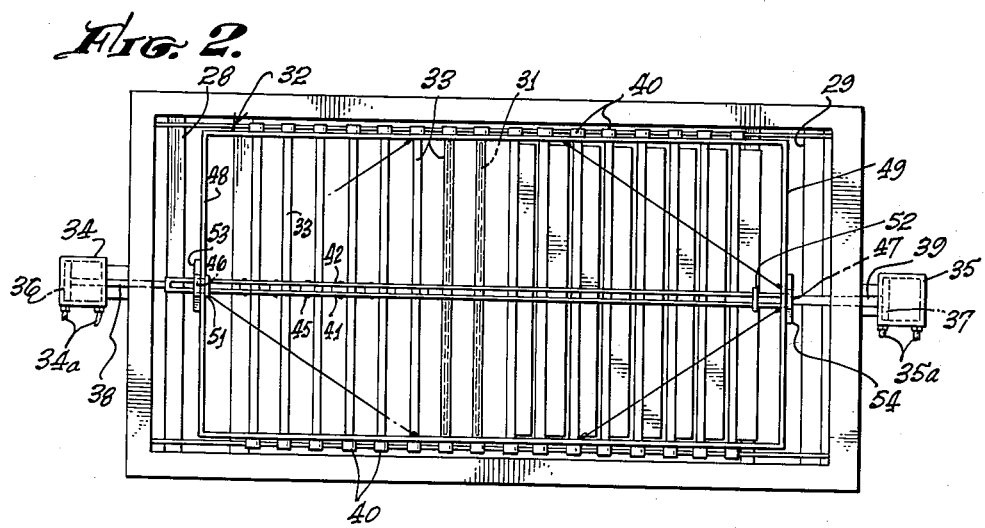
INVENTOR.
HARLEY G. PETERSON,
BY
Knight & Rodgers
ATTORNEYS.

Dec. 13, 1960  H. G. PETERSON  2,964,126
RECIPROCATING DRAG CONVEYOR
Original Filed Sept. 3, 1957  2 Sheets-Sheet 2
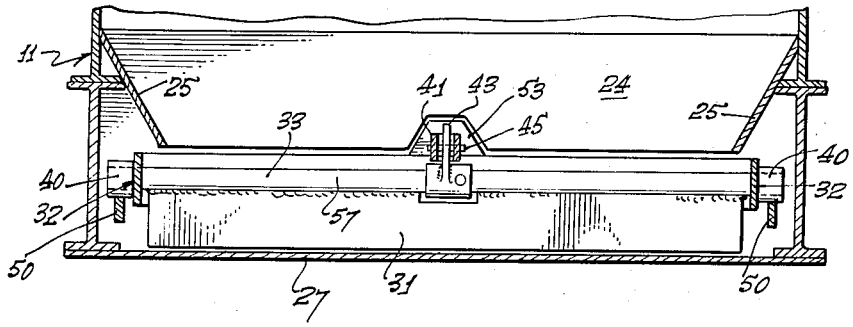
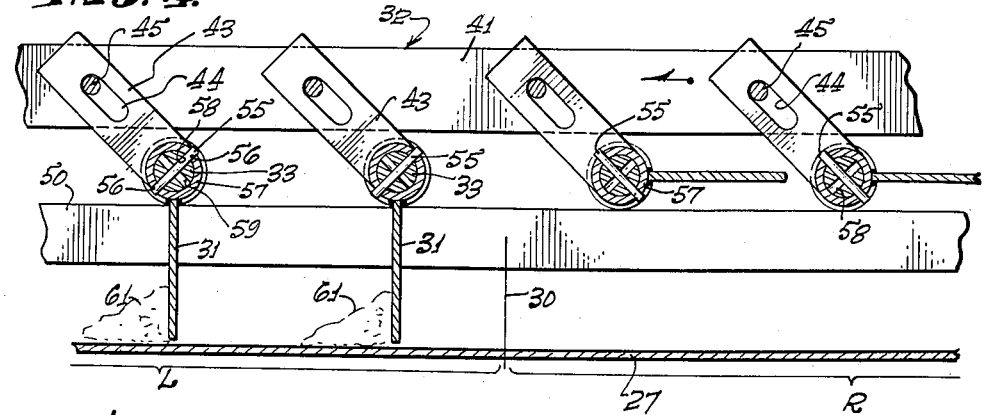
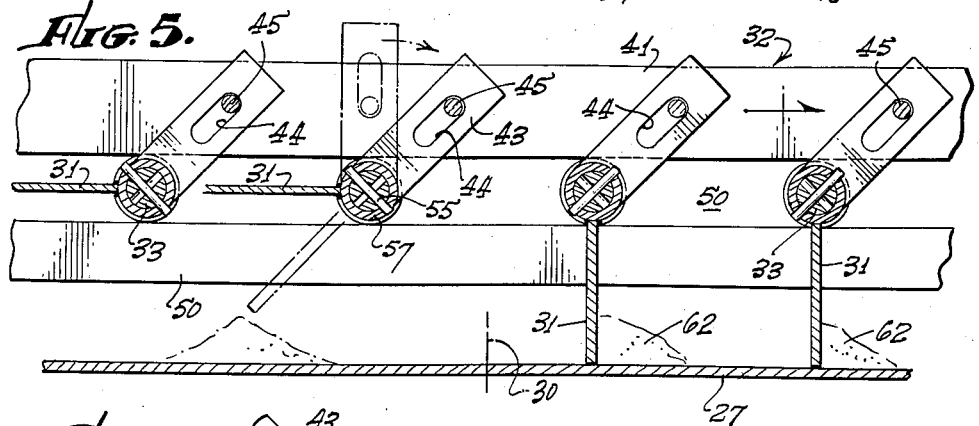
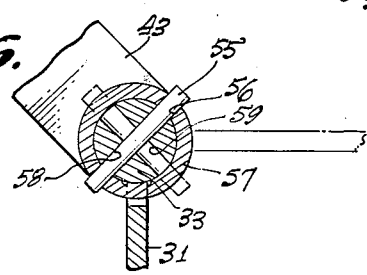
HARLEY G. PETERSON,
INVENTOR.
BY
Knight & Rodgers
ATTORNEYS.

United States Patent Office 2,964,126
Patented Dec. 13, 1960

2,964,126

RECIPROCATING DRAG CONVEYOR

Harley G. Peterson, La Crescenta, Calif., assignor, by mesne assignments, to Joy Manufacturing Company, a corporation of Pennsylvania Continuation of application Ser. No. 681,854, Sept. 3, 1957. This application Oct. 3, 1958, Ser. No. 765,718

4 Claims. (Cl. 183—7)

The present invention relates generally to electrical precipitators and more especially to conveyors for classifying and removing from the precipitator particles deposited on a floor in the precipitator. This application is a continuation of my earlier application filed September 3, 1957, Serial Number 681,854, same subject, now abandoned.

In an electrical precipitator a stream of gas carrying suspended particles which are to be removed, is passed through the precipitator and by the action of an electric field the particles are caused to migrate to and be deposited upon collecting electrodes. Under normal circumstances the deposited particles accumulate on the electrodes and are periodically removed by knocking or rapping the electrodes by any one of various means, typically air or electrically operated hammers. Accordingly, the material falls onto the floor of the precipitator housing or shell and is removed by moving it horizontally over the floor to a point of discharge.

It is a general object of my invention to provide conveying mechanism which permits material to be delivered at both of two spaced material outlets, with the solid collected material advancing in either of two directions, some of the material going to one outlet and some to the other outlet.

An object of the invention is to provide conveying mechanism which is simple in construction, durable, requiring relatively few, light-weight, inexpensive moving parts, little maintenance, and low operating power.

A further object of the invention is to provide a conveying system in which the proportion of the total collected material delivered at each of two different outlets may be varied as desired.

Still another object of the invention is to provide a conveying system which may be adjusted readily to effect such a change in the relative amount of material delivered to the different outlets.

These and other objects and advantages of my invention, which will become apparent as the description proceeds, are attained in a preferred embodiment of the invention by utilizing a drag mechanism consisting of a number of vanes or scraper blades on cross bars or shafts pivotally mounted in a frame which is capable of horizontal reciprocation by suitable means, such as a fluid motor. In order to provide for feathering of the blades or vanes on the return stroke, slotted crank arms are keyed to the shafts carrying the blades; and a control rod or link bar mounted for some lost motion with respect to the reciprocating frame is provided with pins adapted to engage the slots in the crank arms. As the control rod moves in advance of and relative to the frame, upon each change in direction of the rod and the frame, the crank arms rotate the blade carrying shafts through ninety degrees (more or less) to move the blades from a vertical position to a horizontal position and back again. Material outlets are provided at opposite ends of a floor within the precipitator housing so that with successive feathering and pushing strokes by the blades the material is intermittently moved along the floor of the precipitator to one or the other of the two outlets. The blades and crank arms are mounted on the cross shafts in opposite relationships at either side of the transverse center line or other selected division between two areas of the floor so that the material in one area is advanced along the floor of the precipitator toward one outlet and the remainder of the material in the other area is advanced in the opposite direction to the other outlet.

In order to permit a change of position of the division between areas, the crank arms are adjustably mounted upon the cross shafts by means of pins which are adapted to engage transverse openings in the shafts, each shaft having a pair of openings ninety degrees from each other. Consequently, each crank arm may occupy one of two angularly spaced positions relative to the shaft and blade. By removing the pin from one hole in the shaft the crank arm may be rotated ninety degrees while keeping the blade in one position, and the pin may be reinserted in the other hole with the arm in the new position. The change from one position to the other, as will become apparent from more detailed description, causes the feathering action of the blade to take place in the opposite direction so that the material is moved in the opposite direction. This permits changing the point at which the division of material takes place. The feathering action is changed for selected blades to increase or decrease the number of blades acting to move material in a given direction.

This may be advantageous particularly in cases where it is desired to increase or decrease the average particle size in the fractions of the precipitator catch discharged at each of the outlets since the particles of larger diameter tend to be precipitated from the gas stream earlier in the direction of gas movement through the precipitator from one end to the other.

A better understanding of the invention will be afforded by the following detailed description considered in conjunction with the accompanying drawing in which:

Fig. 1 is a vertical longitudinal section of a precipitator with a conveyor constituting one embodiment of my invention;

Fig. 2 is a combined plan view and partial horizontal section of the apparatus of Fig. 1 represented as cut by horizontal plane 2—2, as indicated in Fig. 1;

Fig. 3 is a transverse section of the conveyor portion of the apparatus of Fig. 1, when viewed as cut by the vertical plane 3—3 of Fig. 1;

Fig. 4 is an enlarged fragmentary sectional view of a portion of the conveyor mechanism illustrated in Fig. 1;

Fig. 5 is a view similar to Fig. 4, but showing the conveyor blades in position for material movement to the right as contrasted with movement to the left represented in Fig. 4; and Fig. 6 is a fragmentary detail view, partially in section, of the mounting arrangement of a blade and crank arm upon the supporting cross shaft showing the removable pin securing the arm upon the cross shaft.

Like reference characters are utilized throughout the drawing to designate like parts.

In the form of precipitator illustrated somewhat schematically in Figs. 1 and 2 of the drawing, there is a shell or housing 11 provided with gas inlet and outlet openings 12 and 13 respectively at opposite ends, to provide for the continuous passage of air or other gas through the housing to enable suspended dust or solid particles to be removed from the gas stream by precipitation. Although the apparatus may be operated with the motion of the gas stream in either direction, for the sake of illustration it is assumed that it moves in the direction of the arrows from the inlet opening 12 to the outlet opening 13.

Two sets of electrodes of opposite polarity are mounted within the housing 11 in a manner to provide pairs of spaced, opposing electrodes. One set of electrodes is grounded by connection to the housing 11 while the other set is insulated therefrom and is connected to a source of electric current at high potential to maintain an electrostatic field between the pairs of opposing electrodes. The high tension or discharge electrodes are here shown in the form of a plurality of suspended wires 14. These electrodes may take other forms but are preferably in the form of wires of small diameter to facilitate the formation of corona discharge, as is well known in the art. Electrodes 14 are suspended from a framework consisting of cross-beams 15 and longitudinal beams 16 attached to hanger rod 17, which in turn is supported on high tension, post-type insulators 18 suitably supported above top wall 19 of the housing. These insulators electrically insulate the discharge electrodes from the housing. Hanger rod 17 is electrically connected to a suitable source of high tension current, not shown in the drawings. In order to keep electrode wires 14 straight, they are attached at their lower ends to weights 21, in any suitable manner. Each weight 21 is engaged by a guide loop 22 mounted on supporting structure 22a. Loops 22 permit the weights to move vertically by holding them in any desired position against horizontal movement in order to obtain proper positioning of the discharge electrode.

The grounded or collecting electrodes are preferably in the form of plates 23, for reasons known in the art though the invention is not limited to any particular design of collecting electrodes. As shown in Fig. 1, the electrodes 23, which are grounded to housing 11, lie in parallel vertical planes that extend longitudinally with respect to the direction of the movement of the gas stream between inlet 12 and outlet 13. Plates 23 are normally provided with vertically extending ribs 23a which stiffen the plate against lateral deflection. These ribs may be of any suitable design. For the same purpose stiffening members 23b may be provided at the top and bottom edges of the electrodes.

Collecting electrodes 23 are spaced apart in a direction transverse to the direction of gas flow. A row of discharge electrodes 14 is spaced midway between each pair of collecting electrodes to maintain an electric field between the discharge and collecting electrodes opposing each other. As the gas stream flows through this electric field, the particles become charged and, under the influence of the electric field, are forced toward the collecting electrodes upon which they collect.

Suitable means 20 are provided for periodically vibrating or rapping the electrode plates 23 to remove the solid particles which have been deposited thereon. Such rappers 20 do not constitute a part of my present invention and need not be illustrated in detail. They may take the form, for example, of the electric rappers illustrated in Patent 2,777,535 to W. F. Hull.

The housing 11 may be formed of sheet metal and in the form shown in Fig. 1, the vertical walls are shown with tapering lower ends or dust deflector plates 24 and 25 opening into a chamber 26, having a horizontal bottom wall forming a floor 27 for the housing 11. It will be understood, however, that if desired, a removable wear plate, not shown, may be mounted upon the floor 27 to receive the particles caused to fall from the electrode plates 23 by the rappers 20. Alternatively, floor 27 may be separate from and spaced above the bottom external wall of the housing.

For removing the material deposited on the floor 27, through discharge openings 28 and 29, located one at either of opposite ends of the floor 27, a conveyor assembly is provided which comprises an assembly of scraper blades 31, of the drag type supported in a framework 32 of rectangular shape carrying a plurality of transverse shafts 33, upon each of which one of the scraper blades 31 is secured. The framework 32 is movably supported in any way as by rollers 40 on the ends of shafts 33 projecting outside of the frame. Rollers 40 ride on rails 50, shown in Fig. 3, which are attached to the frame of housing 11.

For producing reciprocating movement of framework 32, suitable cylinders 34 and 35, preferably of the hydraulic type, are mounted one at each end. Although a single cylinder may be employed, the use of a cylinder at each enables the size, weight and cost of moving parts to be reduced by keeping the conveyor parts in tension. The cylinders 34 and 35 are provided respectively with cooperating pistons 36 and 37, secured to piston rods 38 and 39, which in turn are secured to opposite ends of a pair of drag bars 41 and 42. Bars 41 and 42 are parallel to each other but spaced to receive crank arms 43 between the drag bars. Any suitable means may be provided for supplying the cylinders 34 and 35 alternately with hydraulic fluid under pressure to push pistons 35 and 36 and piston rods 38 and 39 back and forth. Such means includes means to limit their inward motion, such as conventional electrically actuated valves and limit switches, not shown, for admitting fluid under pressure to one cylinder and releasing it from the other at the end of each stroke to cause reversal of movement. Since operating means of this type are well known, they are not illustrated herein.

As shown more clearly in Figs. 4–6, a scraper blade 31 and a crank arm 43 are secured to each one of the shafts 33. For reasons that will be explained more clearly hereinafter, the blade 33 may be permanently secured to the shaft 33, as by welding, whereas the arm 43 is adiustably secured. Each of the crank arms 43 is formed with an elongated slot 44, through which passes a cooperating pin 45. The pins 45 are secured to and extend transversely through the drag bars 41 and 42.

The drag bars 41 and 42 are not rigidly secured to the framework 32, but pass loosely through openings 46 and 47 in brackets 53 and 54 extending vertically from transverse end members 48 and 49 of the frame. The drag bars 41 and 42 have stops 51 and 52, each secured both to the ends of the drag bars and to the piston rods 38 and 39, respectively.

The arrangement is such that the stops 51 and 52 bear against a bracket 53 or 54 after initial longitudinal movement of the drag bars 41 and 42 has taken place. Continued longitudinal movement of the bars produces longitudinal motion of the framework 32. Sufficient spacing is provided between each stop 51 and 52 and the associated bracket 53 or 54 to permit the drag bars 41 and 42 to produce rotation of the crank arms 43 through an angle of about ninety degrees before producing motion of the framework 32 during each full stroke or operation of the cylinders 34 and 35. Although in the preferred arrangement limit stops, such as stops 51 and 52, are provided on the drag bars 41 and 42, the invention is not limited thereto and does not exclude the use of stops engaged by angular movement of the crank arms 43 to bring about longitudinal movement of the framework 32 when the blades 31 have been rotated to their extreme positions.

Preferably the spacing and depth of the blades 31 are slightly less than the stroke of the reciprocating motion of the conveyor.

The purpose of the ninety degree rotation of the crank arms 43 together with the shafts 33 and the scraper blades 31 is to permit the blades 31 to feather or be lifted out of the way upon each return stroke after each advance stroke. The material deposited on the floor 27 is moved forward toward an outlet for a short distance by each advance stroke of blades 31, and then the blades are raised out of engagement with the material during the return stroke for each cycle of operation of the cylinders 34 and 35, that is, for each motion of the drag bars back and forth. As illustrated in Figs. 4 and 5, as well as Fig. 1, the blades 31 are so mounted upon the shafts 33 in relation to the positions of the crank arms 43 that some of the blades are in a vertical or downward position while the remainder are lifted to a horizontal or feathering position. For example, the blades at the left hand portion of the floor 27 are down while the drag bars 41 and 42 are moving to the left, and the remaining blades at the right hand portion of the floor 27 are raised. During movement of rods 41 and 42 to the right, the positions of the blades in the two groups are reversed.

In order to permit adjustment or change in the number of blades which are down at any time, the crank arms 43 are angularly adjustable relative to the blades 31. In the embodiment illustrated the crank arms 43 are adjustably secured to the shafts 33 and the blades 31 are rigidly secured to the shafts. The adjustable or rotatable connection is accomplished in the arrangement illustrated by the use of pins 55, driven through transverse diametral openings 56 in sleeves 57, to each of which an arm 43 is secured in a suitable manner as by welding or brazing. Each sleeve has such an internal diameter as to make it a slip fit upon a shaft 33. Each shaft 33, however, is provided with a pair of transverse diametral openings 58 and 59, which are preferably at right angles to each other, more or less. As illustrated in Figs. 4 and 6, for the blades 31 of the group L on the left, the pins 55 pass through openings 58 of the shafts 33, whereas for the blades 31 of the group R on the right, the pins 55 pass through openings 59 of the shafts 33.

As illustrated in Fig. 4 when the bars 41 and 42 are moving toward the left, the blades 31 of the left hand group L are down and engage piles 61 of granular material, causing the piles to move to the left as the blades advance in that direction. The blades 31 of the right hand group R are lifted out of the way or feathered so as to have no engagement with the piles of solid materials at 62. As shown in Fig. 5, when the direction of movement of the bars 41 and 42 is reversed, but before there is movement of the framework 32, the pins 45 in the elongated slots 44 of the crank arms 43 cause all of the crank arms to rotate clockwise about the axes of shafts 33 for an angle of about ninety degrees. After this rotation has taken place the bracket 51 bears against the vertical bracket 53, so as to cause advance movement of the framework 32 to the right in Figs. 2 and 5, which accordingly carries all of the shafts 33 to the right. With the blades 31 of the right hand group R now down and the remaining blades (in group L) feathered or out of the way, the blades to the right cause advance movement of the piles 62 of solid material toward the right and the opening 29. It will be seen, therefore, that the solid material is progressively moved from some division line or plane 30 toward the left and toward the opening 28; but to the right of that division line movement is to the right toward the opening 29.

In removing solid particles from a stream of gas in which such particles are suspended and selectively separating particles of different sizes, the gas carrying the suspended particles is passed through the housing 11, between the openings 12 and 13, along a path from the inlet 12 to the outlet 13. An electrical field is maintained between the electrodes 14 and 23 which causes the particles to precipitate on the plates 23. The plate electrodes 23 are periodically rapped by means of the rapper 20 to cause the precipitated particles to fall from plates 23 under the action of gravity onto the floor plate 27 of the housing. In order to separate the particles which are precipitated on the electrodes 23 in the initial portion of the path of the moving stream of gas from those precipitated in the later portion of the path, the conveyor blades 31 are so arranged that the initially precipitated particles are moved toward the opening 28, whereas those precipitated subsequently are moved toward the opening 29. Thus with each actuation of the pistons 36 and 37 the drag bars 41 and 42 are reciprocated to cause the piles 61 of particles, those first precipitated, to be advanced step-by-step toward the left outlet 29 upon each leftward stroke until eventually they fall out through the opening 28. Likewise the piles of particles 62 which are subsequently precipitated are progressively advanced step-by-step to the right by the action of the scraper blades 31 so that this material eventually is delivered to the opening 29.

It will be understood that suspended particles of different sizes vary in the time required to precipitate them on a collecting electrode because of the inherent operating characteristics of an electrical precipitator. As a result the particles that are precipitated on the electrodes and then fall onto floor plate 27 are generally larger in diameter in the first half L of the precipitating zone than those in the second half R of the zone. This can be most easily explained by reference to the equation for efficiency generally used in design.

The collection efficiency (E) is given by the formula $E = 1 - e^{-wf}$, where $f$ is the ratio of the collecting electrode area to the gas flow rate and $w$ is the draft velocity measured perpendicular to the direction of gas flow. For a given precipitator $f$ is a constant and only $w$ varies. This equation was derived by W. Deutsch and is published in "Annalin der Physik" at vol. 68, pg. 343, issued 1922.

Assume two particles of different diameters enter the space between two collecting electrodes at equal distances from a collecting surface. Research has shown that for particles larger than about ½ micron in diameter the drift velocity toward the collecting surface under the action of an electric field of given strength is directly proportional to the diameter of the particle. See article by Dr. Wayne T. Sproull in "Industrial & Engineering Chemistry," vol. 47, pg. 940, May 1955 entitled, "Collecting High Resistivity Dust and Fumes."

Although particles of all sizes appear in both zones L and R, there is sufficient selective separation that the catch in zone L has a larger percentage of larger diameter particles than the catch in zone R. This condition exists to a progressively decreasing degree from the inlet side to the outlet side. This separation according to size is not sharp and does not eliminate all fines from the initial section, but it is adequate for many purposes. If it is desired to change the dividing line between particles which are delivered to one or the other of the openings 28 or 29, the change is made merely by removing the pin 55 from one or more of the cross shafts 33 adjacent to the division line 30 between the piles of particles 61 and 62, so that one or more of the scraper blades 31 which was formerly pushing piles of particles to the left will now push them to the right or vice versa.

From the foregoing description it will be apparent that various changes in the arrangement of parts may be made without departing from the spirit and scope of my invention. Accordingly it is to be understood that the foregoing description is considered illustrative of, rather than limitative upon, the appended claims.

I claim:

1. In an electrical precipitator having means establishing a collection zone in which particles are caused to fall, the combination comprising:

means horizontally directing through the collection zone a stream of gas with particles suspended therein;

floor means underneath the collection zone and extending horizontally in a direction parallel to the flow of said stream of gas, said floor means being in a position to receive material falling from the collection zone;

spaced material outlets located one at each of two opposite ends of the floor means, said material outlets being spaced apart in the direction of said gas flow;

material conveying means having oppositely acting portions for moving the materials over the surface of the floor means in opposite directions from a dividing line to each of said outlets, the oppositely acting portions of the conveying means being on opposite sides of such dividing line, said conveying means including means for adjusting the action of a portion of the conveying means to reverse the direction of action thereof for adjusting the location of the dividing line between the material conveyed to one outlet and material conveyed to the other outlet.

2. In an electrical precipitator having means establishing a collecting zone in which particles are caused to fall, the combination comprising:

means directing through the collection zone a stream of gas with particles suspended therein;

floor means underneath the collection zone in a position to receive material falling from the collection zone, said floor means extending horizontally;

a pair of spaced material outlets, said outlets being spaced apart in the direction of said gas flow and being located at opposite sides of a continuous and uninterrupted section of said floor means;

and a reciprocating conveyor assembly comprising a plurality of scraper elements adapted to be moved horizontally over the surface of said continuous section of said floor means, the scraper elements being arranged in two groups adapted to move material in opposite directions along the upper surface of said floor means, whereby the material falling on the floor means is divided into two portions of which one portion is moved to each of the two spaced material outlets; said conveyor assembly also including a framework on which said scraper elements are pivotally mounted for movement between a lowered scraping position and a raised feathered position, one group of said elements being lowered to scraping position when the other is feathered, and the elements being individually adjustable on their pivotal mounting whereby one or more elements can be individually changed from feathering to scraping positions to increase or decrease the number of blades pushing in one direction for varying the proportions of material handled on each side of the dividing line.

3. A conveyor for bulk material comprising: horizontally extending floor means upon which the material rests, said floor means having a pair of spaced material outlets located at either of two opposite ends of the floor means, and a reciprocating conveyor assembly including a framework carrying a plurality of rotatable cross shafts, each with a transverse opening therein, a crank arm on each shaft, a scraper blade on each shaft having lifted and lowered positions according to the angular position of the cross shaft, and cooperating with the floor means when in the lowered position, one of the two members of the group consisting of the crank arm and the scraper blade being fixed to the shaft, and the other member having a supporting sleeve surrounding the shaft and to which sleeve such other member is fixed, the sleeve having a transverse pin-receiving opening, a pin for each shaft adapted to pass through said transverse sleeve opening and the transverse shaft opening for securing the scraper blade to the shaft, one of the members of said group having a second transverse opening angularly spaced from the other transverse opening therein, whereby the scraper blade and the crank arm may be secured relative to each other in either of two different relative angular positions, and means for rotatively oscillating the said cross-shafts in unison and reciprocating the framework, so that each oscillation in a given direction lifts a scraper blade to a feathering position or lowers it to a scraping position according to which of the transverse openings is engaged by the pin securing such blade.

4. A conveyor for bulk material comprising: horizontally extending floor means upon which the material rests, said floor means having a pair of spaced material outlets located at either of two opposite ends of the floor means, and a reciprocating conveyor assembly including a framework carrying a plurality of rotatable cross shafts, a crank arm on each shaft, a scraper blade on each shaft movable between lifted and lowered positions according to the angular position of the cross shaft, and cooperating with the floor means when in the lowered position, means on each shaft to lock the associated crank arm and scraper blade in a selected one of two different angular relations whereby the scraper blade and the crank arm at each shaft may be secured relative to each other in either of two different relative angular positions, and means for rotatively oscillating the said cross-shafts in unison and horizontally reciprocating the framework, so that each oscillation in a given direction lifts a scraper blade to a feathering position or lowers it to a scraping position according to the manner in which the locking means is arranged to secure the crank arm and scraper blade.

References Cited in the file of this patent
UNITED STATES PATENTS

| | | |
|---|---|---|
| 1,185,136 | Seaman | May 30, 1916 |
| 2,381,185 | Rogers | Aug. 7, 1945 |